United States Patent [19]

Yen

[11] Patent Number: 4,675,986
[45] Date of Patent: Jun. 30, 1987

[54] ELECTRICAL LAPPING GUIDE FOR CONTROLLING THE BATCH FABRICATION OF THIN FILM MAGNETIC TRANSDUCERS

[75] Inventor: Edward T. Yen, San Jose, Calif.

[73] Assignee: International Business Machines, Armonk, N.Y.

[21] Appl. No.: 885,987

[22] Filed: Jul. 15, 1986

Related U.S. Application Data

[63] Continuation-in-part of Ser. No. 760,188, Jul. 29, 1985, abandoned.

[51] Int. Cl.$^4$ .......................... G11B 5/127; H01F 7/06
[52] U.S. Cl. .................................. 29/603; 29/602 R; 29/592 R; 29/705; 29/707
[58] Field of Search ................ 29/602 R, 603, 592 R, 29/705, 707, 720; 73/104, 105; 51/165 R

[56] References Cited

U.S. PATENT DOCUMENTS

| | | | |
|---|---|---|---|
| 3,787,638 | 1/1974 | Murai | 179/100.2 |
| 3,821,815 | 6/1974 | Abbott et al. | 360/110 |
| 4,014,141 | 3/1977 | Riddle et al. | 51/165 R |
| 4,155,106 | 5/1979 | Muraoka et al. | 360/112 |
| 4,190,872 | 2/1980 | Jones et al. | 360/125 |
| 4,295,173 | 10/1981 | Romankiw et al. | 360/125 |

OTHER PUBLICATIONS

IBM Tech. Discl. Bull., vol. 18, No. 11, Apr. 1976, pp. 3782-3783, "Element Height Determination for Thin Film Transducers".
IBM Tech. Discl. Bull., vol. 23, No. 4, Sep. 1980, p. 1631, "Lapping Magnetic Head Elements".
IBM Tech. Discl. Bull., vol. 23, No. 2, Jul. 1980, p. 776, "Electrical Lapping Guide".
IBM Tech. Disc. Bull., vol. 11, No. 12, May 1969, p. 1792, "Alignment of Read-Write Heads in Sliders".
IBM Tech. Discl. Bull., vol. 23, No. 6, Nov. 1980, p. 2550, "Lapping Guides for Magnetic Heads".

Primary Examiner—Mark Rosenbaum
Assistant Examiner—Irene Graves Golabt
Attorney, Agent, or Firm—Otto Schmid, Jr.

[57] ABSTRACT

Method and apparatus for controlling the throat height of batch fabricated thin film magnetic transducers. During deposition of the transducer elements on a substrate, a resistive electrical lapping guide is deposited on at least one end of the array of transducer elements. The electrical lapping guide includes a plurality of switching junctions formed between a section of electrically resistive material and conductors. At least one switching junction is deposited on the substrate having a known switching plane position. During lapping of the transducer pole tip ends to a final height, the switching junction will change state to provide an accurate indication of the lapped throat height. The throat height, as determined from measured resistance of the lapping guide, is compared to the switching junction position at the time said switching junction changes state. Subsequent resistance measurements are calibrated in light of this comparison.

17 Claims, 6 Drawing Figures

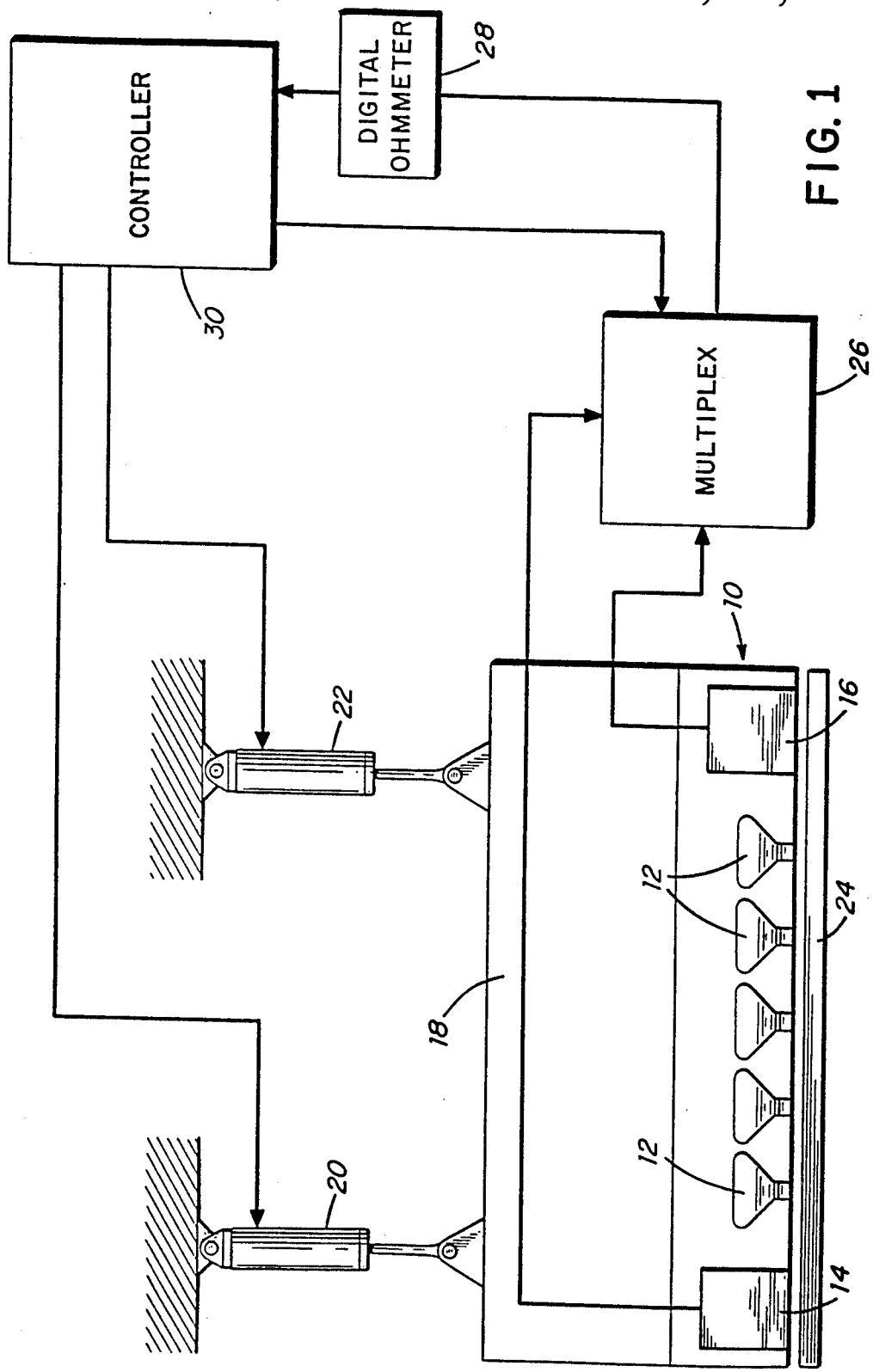

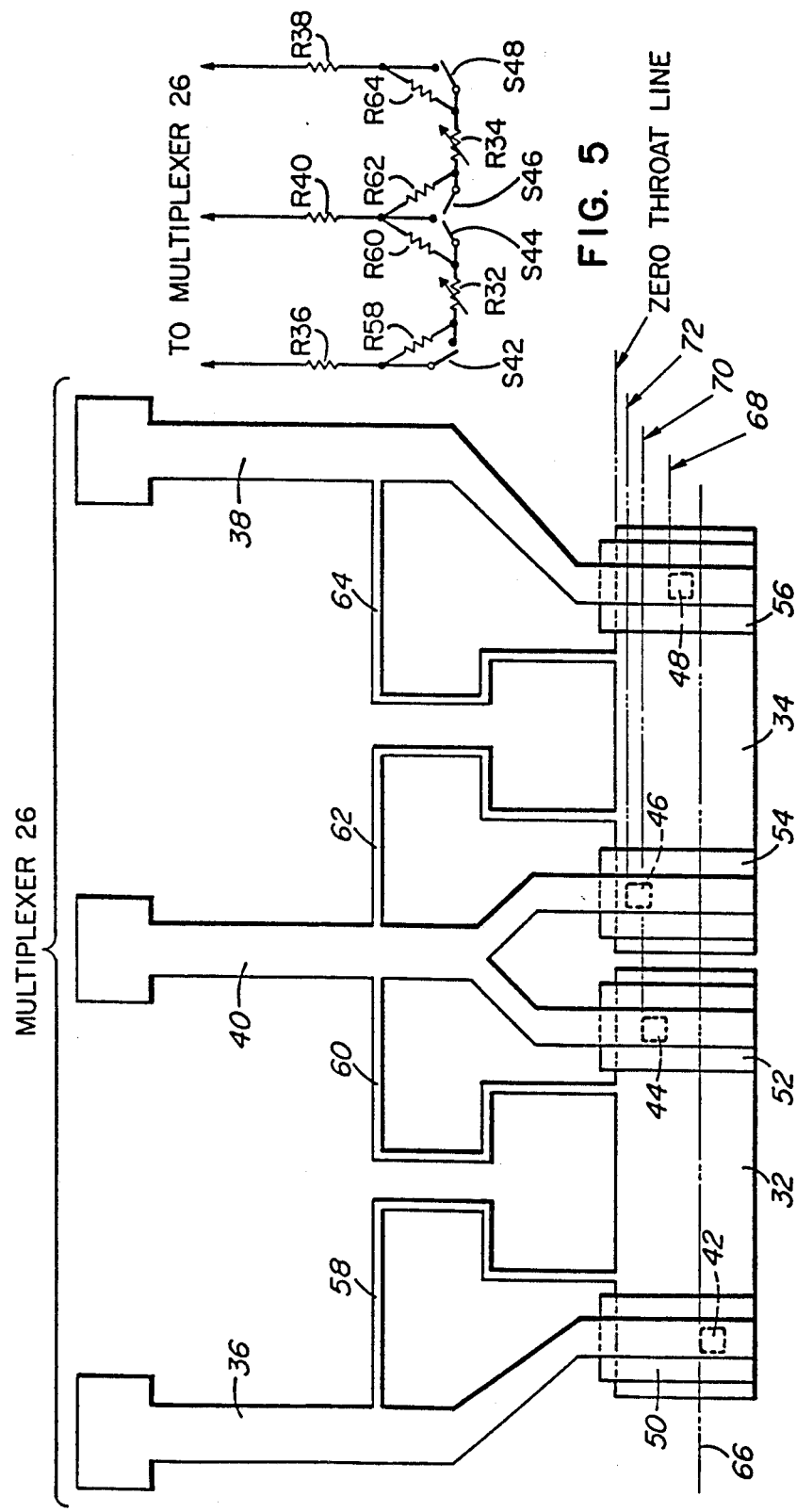

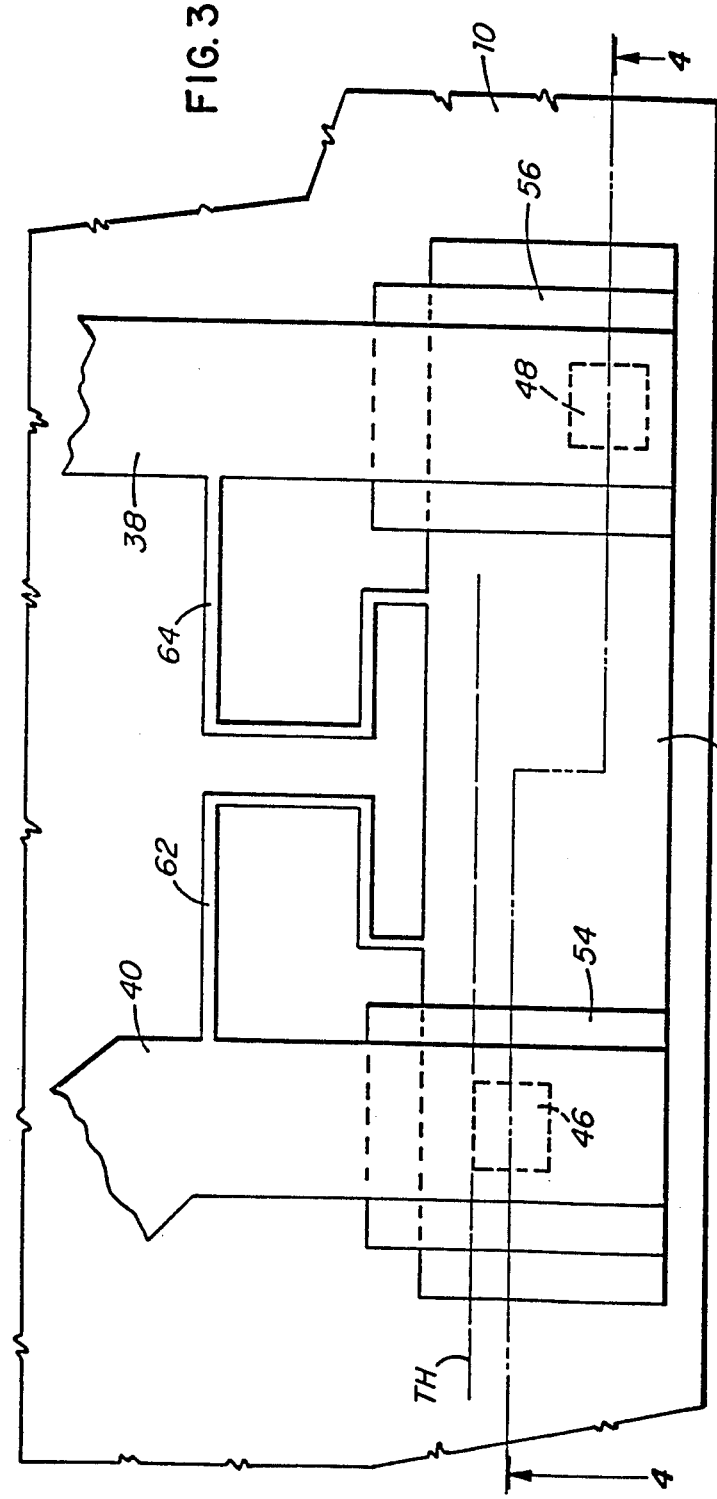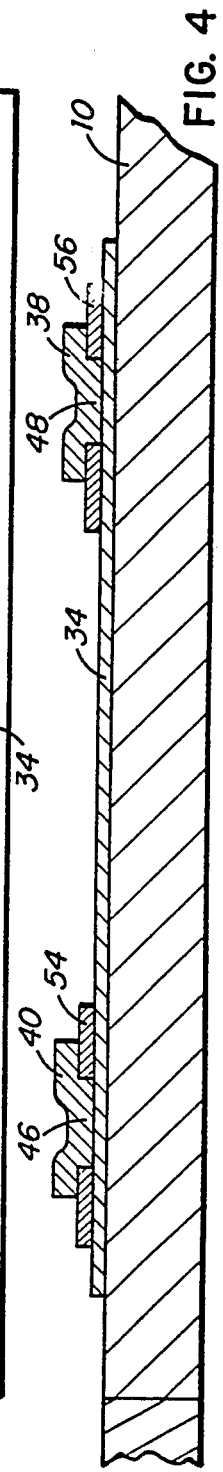

ELECTRICAL LAPPING GUIDE FOR CONTROLLING THE BATCH FABRICATION OF THIN FILM MAGNETIC TRANSDUCERS

This is a continuation-in-part of application Ser. No. 06/760,188, filed July 29, 1985, now abandoned.

BACKGROUND OF THE INVENTION

This invention relates generally to a dynamic magnetic information storage retrieval apparatus and a method and apparatus to control the manufacture of magnetic transducers, and in particular to an electrical lapping guide structure useful for batch fabricating thin film magnetic heads.

FIELD OF THE INVENTION

In high speed data processing systems, magnetic disks have been employed for large memory capacity requirements. Data is read and written onto the disks from magnetic transducers commonly called magnetic heads which are positioned over the disk during the retrieval and storage of data on tracks of the disks. The requirements for higher data density on magnetic disks have imposed a requirement to read and write more data on narrower tracks located on the disk. Further, the disks have become thinner in order to improve the coercivity for maintaining the integrity of the data on the disk. The requirement for a higher data density imposes a higher flux density generation and sensing capability on the transducer. In order to achieve maximum efficiency from the transducer or head element, the element or pole pieces are formed from thin films of a magnetic material. The pole pieces must have a pole tip height dimension, commonly called throat height, which must be maintained within a certain limited tolerance for generating a maximum amount of electrical signals from a given head. For a further discussion of the necessity to maintain the throat height to a certain distance, reference is made to U.S. Pat. Nos. 4,190,872 and 4,295,173, both assigned to the assignee of the present invention.

A method of producing a required throat height includes a lapping stage in which an abrasive griding surface accurately grinds the pole tips to a desired length. Suitable techniques for controlling the throat height during the lapping operation are described in U.S. Pat. No. 3,821,815, also assigned to the assignee of the present invention. In this patent, a technique is employed for measuring the resistance of an element located on the substrate containing the transducer being lapped to a final throat height. The resistance element is lapped along one dimension to the same extent as the transducer pole tips. The resistance of the element at any given time indicates the amount of material that has been removed from the element and hence the resistance is an indication of the final throat height of the transducer being lapped.

A further U.S. Pat. No. 4,014,141, also assigned to the assignee of the present invention, describes another apparatus for controlling the grinding and the lapping of a magnetic head surface under control of electrical lapping guides.

The present invention provides for an improved electrical lapping guide useful, for instance, in one of these systems described above to control the lapping process such that the final throat height of thin film magnetic heads can be accomplished using batch processing techniques.

DESCRIPTION OF THE PRIOR ART

Electrical lapping guides are well known in the processing of thin film transducers. Most often the electrical lapping guide is a flat element resistor having one of the electrical guide resistors located on each end of a row of a plurality of magnetic transducing elements, such as is shown in the IBM Technical Disclosure Bulletin, Vol. 18, No. 11, April 1976 at pages 3782-3. Similar electrical lapping guide elements are disclosed in the IBM Technical Disclosure Bulletins at Vol. 23, No. 4, September 1980 at page 1631 and Vol. 23, No. 2, July 1980 at page 776. In all of these articles, an electrical lapping guide is deposited on both ends of a row of magnetic transducers shown as read elements or data elements or an array of devices in the articles. As is disclosed in these articles, as the lapping proceeds, the resistance between the conductors of the electrical lapping guides is increased as the material between the conductors of the guides is removed. These articles disclosed one means of controlling the final throat height of the finished head and that is by depositing a separate test element to which the electrical lapping guide is compared in order to stop the lapping process at the correct throat height.

An object of the present invention, therefore, is to provide an enhanced electrical lapping guide apparatus useful for the control of the grinding and lapping processes to obtain a precise throat height of the thin film magnetic head.

Another object of the present invention is to provide an electrical lapping guide that is designed to precisely control the manufacturing processes such that the throat height of the completed magnetic head can be held to a precise length.

A further object of the invention is to provide an electrical lapping guide apparatus that can be monitored during a lapping operation to produce a precise throat height of thin film magnetic heads.

Still another object of the present invention is to provide an enhanced method of making electrical lapping guide apparatus using the batch processes used to manufacture thin film magnetic heads.

Electrical lapping guides previously included only junction connections between conductors and straps. When the junction connection was broken during the lapping process, the resistance between the conductors went to infinity because the electrical connection to the strap was interrupted. The lapping process could not be controlled further since no resistance measurement was possible unless a second lapping guide was provided.

Yet another object of the invention is to provide an electrical lapping guide having junctions that provide electrical contact to a strap of higher electrical resistance than usual in a lapping guide, with the junction bridging a resistive element and producing a change in the electrical conduction when broken that provides an indication of the lapping progression to determine the throat height of the magnetic head.

SUMMARY OF THE INVENTION

In accordance with the present invention, a resistive electrical lapping guide is deposited on at least one end of a linear array of magnetic head elements during the deposition of the head elements on a substrate. The electrical lapping guide includes a plurality of switching junctions formed between a section of electrically resistive material and conductors. The conductors provide electrical interconnection to external testing equipment. The interconnection or switching junction between the conductor and the section of resistive material or a strap provides a known switching plane when the junction is interrupted by the lapping process. Each switching junction is interrupted to form a change in the electrical state between the conductors when a known throat height is reached. Forming the electrical lapping guide resistor strap and the switching junctions at the same time that elements of the film transducer are formed, provides good registry between the throat height measurements and the actual pole tip dimension of the magnetic head. A shunt resistor deposited in parallel with the switching junction continues electrical conduction while enhancing detection of the opening of the switching junction. In a preferred embodiment the resistance of the strap is formed by one of the layers deposited during the formation of the magnetic head and used in the process for building a magnetic head. The strap resistor is thinner than that used in the prior art electrical lapping guides and therefore is of a higher resistance than that formally used.

Another object of the present invention, therefore, is to provide an electrical lapping guide for the batch fabrication of magnetic heads that includes a plurality of points at which the electrical current passed through the electrical lapping guide during the processing of the magnetic head is switched from different paths by interrupting conductor and strap junction points at several throat height lengths to provide a precise control of the lapping process by the electrical guide.

Yet another object, therefore, is to provide an electrical lapping guide that has a higher resistance between the conductors than that used by prior art devices.

Still another object is to provide a shunt resistor across the switching junctions of an electrical lapping guide to enhance the detection of the change in state of the switching junction when the contact between the conductor and the strap is interrupted by lapping through the junction.

Further in accordance with the present invention, a method is claimed for making electrical lapping guides during the process of forming at least one batch fabricated magnetic transducer selecting a special site on a wafer adjacent to and aligned with the magnetic transducer. A conductive layer of an electrically conductive material is then deposited on the substrate at the selected site to form the strap of a strap-to-junction type electrical lapping guide and to form a serpentine-shaped length such that one end of the length is electrically connected to the strap of conductive film material. An electrically insulating material is then deposited onto the first conductive layer at two spaced apart areas at the selected site. The insulating material is deposited and formed at the same time and of the same material that determines the throat height of the transducer. The insulating material includes vias to the conductive material at the guides. The vias are formed at selected throat height lengths relative to the transducer. A second layer of an electrically conductive material is deposited over the vias to form conductors at the spaced apart areas for electrical measurement of the strap. The second conductive layer is placed into electrical contact with a second end of the serpentine-shaped length of first conductive material.

The resistance of the electrical lapping guide strap resistor is monitored during the lapping of the magnetic head array to achieve the final head element throat height. At a known throat height which is greater than the final throat height, the switching junction opens to change electrical state between the conductors of the electrical lapping guide. This change in state provides a distinct readily detectable change in resistance that can be readily sensed by the test equipment connected to the electrical lapping guide. Detection of the change of state of the switching junction provides a known throat height which may be compared with the throat height determined from the resistance measurement of the strap in the electrical guide. These changes in state allow the subsequent resistance measurements to be calibrated in light of the interruption of the switching junction that provided the change in state, to provide an accurate determination of the amount of material removed in the lapping process and thereby provide an accurate determination of the throat height of the magnetic head array that is being lapped.

Therefore an object of the present invention is to provide a method that produces a more precise control of the lapping process used to form a throat height of the magnetic heads in the array being lapped to a more precise state than formerly possible.

In prior art devices, when the junction of a strap and junction electrical lapping guide was broken by the lapping process, the entire electrical connection to that portion of the guide was forever interrupted. With the present invention, when the junction switch is broken by the lapping process, the electrical conduction continues through the resistor that bridges the junction switch. Therefore the electrical lapping guide may have a second junction switch, or more, bridged by resistors that can provide continued control of a continuing lapping process.

It is, therefore, another object of the present invention to provide an electrical lapping guide that includes a resistor that bridges the junction switches of the guides to permit continued control of the lapping process of thin film magnetic transducers.

These and other objects of the present invention will become apparent to those skilled in the art as the description proceeds.

BRIEF DESCRIPTION OF THE DRAWINGS

The various novel features of this invention, along with foregoing and other objects, as well as the invention itself both as to its organization and method of operation may be more fully understood from the following description of illustrated embodiments when read in conjunction with the accompanying drawing, wherein:

FIG. 1 is an overall system block digram illustrating a lapping system that can be used with the guides according to the present invention.

FIG. 2 represents one end portion of the substrate being lapped in FIG. 1 showing the electrical lapping guide in more detail according to an embodiment of the present invention.

FIG. 3 is an enlarged portion of the electrical lapping guide of FIG. 2 showing the details of the strap and junction design useful with the present invention.

FIG. 4 is a sectional view taken along lines 4—4 of FIG. 3 and showing the detail of the interconnection between the conductor and the strap at the junction of the electrical lapping guide.

FIG. 5 is an electrical schematic representation of the electrical lapping guide structure of FIG. 2.

DESCRIPTION OF THE PREFERRED EMBODIMENT

Figure 6:
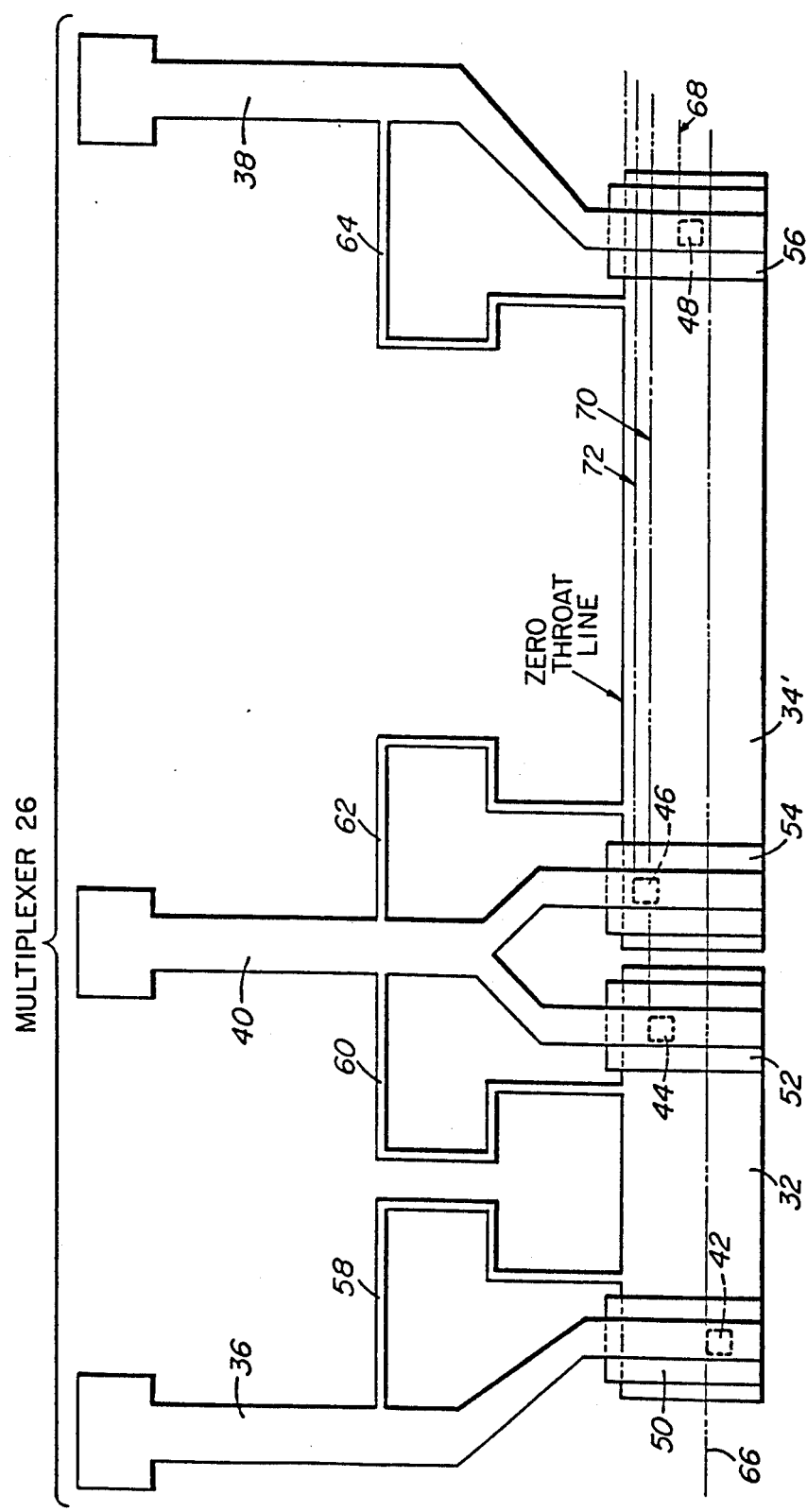
FIG. 6 represents one end portion of the substrate being lapped in FIG. 1 showing the electrical lapping guide in more detail according to a preferred embodiment of the present invention.

The present invention is preferably for use in the fabrication of thin film head assemblies. The transducer portion of the thin film head is formed by depositing layers of magnetic material, electrically conductive material and insulated material to form the well known pole pieces and magnetic gap necessary for the transducing function with a magnetic coating formed on a disk. A plurality of transducers are deposited onto a wafer which is then cut to form rows of the transducers with the transducers set in a side-by-side relationship. Electrical lapping guides are formed onto the wafer at the same time that the transducers are deposited. At least one electrical lapping guide is deposited at each end of the row of transducers. The electrical lapping guides are used during the lapping process that determines the throat height of the transducers. The wafer eventually is formed to become the slider of the magnetic head. The slider is mounted onto a suspension system which in turn is mounted to an accessing system for locating the magnetic head onto tracks formed by the magnetic heads when writing onto the rotating disk. The electrical lapping guide of the present invention, therefore, controls the lapping of a row of transducers in the batch fabrication process.

Referring to FIG. 1, there is shown an overall system block diagram of apparatus that controls the lapping of a portion of a substrate row 10 having a plurality of transducer elements 12 with electrical lapping guide systems 14 and 16 located at both ends of the row. As stated previously, this one row 10 of transducers 12 and electrical lapping guides 14 and 16 are but one section from the total wafer which includes a plurality of rows as well as a plurality of columns of transducer elements. The substrate row 10 is fastened to a holder 18 and placed against two actuators 20 and 22 which position the substrate into a spaced relationship with a lapping plate 24. The actuators urge the substrate row 10 against the lapping plate 24 and control the amount of pressure placed against the holder 18. The lapping plate 24 is, as is known to those skilled in the art, an abrasive surface which through relative motion affects lapping of the substrate row 10. The substrate row 10 is lapped in order to remove material such that the throat of the transducers 12 can be precisely located under control of the electrical lapping guide systems 14 and 16.

The depth of the lapping provided by the lapping plate 24 is monitored through the two electrical lapping guide systems 14 and 16. The electrical lapping guide systems 14 and 16 are deposited on the substrate at the same time as various layers of the transducer elements 12, and provide a means of electrically determining the throat height for the transducer elements. The electrical lapping guide systems 14 and 16 are connected to a multiplexer 26. The multiplexer 26 senses the electrical resistance of the separate electrical lapping guide systems and directs this information to a meter 28 which can be a standard ohmmeter measuring electrical resistance and also sends this information to a controller 30. The controller 30 in turn controls the two actuators 20 and 22 such that the substrate row 10 can be kept level by varying the amount of pressure applied by each actuator at its end of the substrate row.

With electrical lapping guide systems 14 and 16 at each end of the row, it is possible to control the amount of pressure each end of the substrate rows receive, and thus permit the actuators 20 and 22 to maintain the substrate row 10 level with the lapping surface. Thus, by comparing the relative resistance measurements from each lapping guide system, the throat heights of each of the plurality of transducers along the row can be maintained at the same length during lapping. The resistance measurements provided by the electrical lapping guide systems 14 and 16 are determined from the multiplexer 26 and the meter 28. Under control of the controller 30, each of the resistance measurements provided by electrical lapping guide systems 14 and 16 may be addressed through the multiplexer 26 and the meter 28. The results of the measurement is stored in the controller 30 and is utilized as an indication of the throat height achieved for the transducer elements 12 during the lapping process. The controller 30 can, by constantly measuring the resistance of each of the electrical lapping guide systems, maintain the substrate row 10 level with respect to the lapping plate 24. Additionally, when a certain throat height is detected as having been achieved through the lapping process, the controller 30 may command the actuators 20 and 22 to withdraw the substrate row 10 from the lapping surface to terminate the lapping process.

In general, the resistances and the switching aspects of each electrical lapping guide system 14 and 16 is sensed by the controller 30. The controller 30 reacts to any difference in resistance, for instance, between the electrical lapping guide systems by applying added pressure to the end of the substrate row with the lower resistance such that additional material can be removed from that end to cause the resistance of the electrical lapping guide to be removed quicker and thereby increase the resistance measured at its electrical lapping guide as will be discussed later. When a switching junction is opened during the lapping process, the controller 30 can react by withdrawing the substrate row 10 from contact with the lapping process. Or the process can be changed from a rough lap process to a fine lap process such that more material can be removed for instance at the beginning of the lap and a further lap used for better control as the ideal throat height is approached as indicated by the electrical lapping guide systems. Examples of lapping systems that could be adapted to perform the control of the lapping system as shown in FIG. 1 are disclosed in the aforementioned U.S. Pat. Nos. 3,821,815 and 4,014,141. Each of the electrical lapping guide systems 14 and 16 shown in FIG. 1 are identical. The structure of one of the electrical lapping guide systems 14 and 16 of FIG. 1 is shown more particularly in FIG. 2.

Referring now to FIG. 2, the electrical lapping guide system 16 includes two straps 32 and 34 interconnected to end conductors 36 and 38 and a centertap conductor 40 through vias 42, 44, 46 and 48 formed in insulation layers 50, 52, 54 and 56, respectively. These vias, called junctions or junction switches for purposes of this invention, are the controlled points at which the conductors connect electrically with the straps. Each end conductor 36 and 38 is connected to one strap 32 or 34, while the center conductor 40 is connected to one end of both straps. A layer of conductive material forming thin film resistors 58, 60, 62 and 64 interconnect the conductive material of the conductors 36, 38 and 40 and the conductive material of the straps 32 and 34 to effectively bridge the interconnecting junction switches 42, 44, 46 and 48. Thus for instance, the thin film resistor 58 bridges the junction switch 42 at the left hand conductor 36 which is connected through the junction switch 42 to the right end of the strap 32. Thin film resistor 60 bridges the junction switch 44 interconnecting the right end of the strap 32 to the center conductor 40. The thin film resistor 62 bridges the junction switch 46 connecting the centertap conductor 40 to the right strap 34 while the thin film resistor 64 bridges the junction switch 48 connecting the strap 34 to the right conductor 38. The conductors 36, 38 and 40 are connected through external wires to the multiplexer 26 for the sensing of the resistances between the conductors as caused by the thin film resistors, junction switches, and the straps themselves.

The material forming the strap and the thin film resistors is preferably made from an electrically conductive material such that its resistance is as high as possible. The width of the thin film resistors is much smaller than that of the straps and therefore the thin film resistors have a much higher resistance compared to the straps. Since preferably the layers of the electrical lapping guides are deposited at the same time as portions of the transducer elements, it is possible that one of the seed layers used to electrically activate the substrate for a subsequent electroplating operation can be used to form both the straps 32 and 34 and the thin film resistors 58–64. Thus the material could be nickel-iron sputter deposited on the substrate in preparation for an electroplating process which deposits the nickel-iron material forming either one of the pole pieces of the transducer elements. Preferably, according to the present invention, the strap and thin film resistors are formed from a chromium layer which is deposited in the formation of the transducers as an adhesive enhancing layer or as a layer to better optically defined different portions of the transducer. The insulating layers 50, 52, 54 and 56 can be formed at the same time as one of the insulative layers used in the transducer element. Thus the insulating layers may be formed from an aluminum oxide which is preferred as the magnetic gap layer of the transducer. Or the insulated layer may be any one of the layers that insulates the conductive layers of the transducer from the pole pieces. Thus the insulated layers 50–56 may be formed from the hard-baked photoresist formed over the first pole piece before the conductive layer is deposited or it can be formed from the photoresist insulative material that is placed over the conductor before the second pole piece is deposited. Each of the insulating layers 50–56 include the vias 42–48, respectively, which is a lack of insulative materials permitting an electrical connection between the conductors 36–40 and the straps 32 and 34.

The conductors 36, 38 and 40 are then deposited over the insulated material in the approximate shape as shown such that the conductors are electrically insulated from the straps except through the vias. These interconnections between the conductor and the strap at the vias are called junctions or junction switches with the electrical lapping guide called a strap-to-junction arrangement to signify the interconnection of the conductors through junctions with the straps. The conductors 36, 38 and 40 may be formed together with any one of the electrically conductive materials used in the transducer elements. The conductors are generally made to have low resistance and therefore are preferably formed of the nickel-iron material which is electroplated at the same time that either the first pole piece or the second pole piece of the transducer elements is formed. Or the conductive elements may be electroplated copper formed together with the conductors of the transducer elements or any of the other electrically conductive layers used in the formation of the transducer elements. Preferably, the insulating layers 50–56 are deposited at the same time with the layer that determines the throat height of the transducer elements. Since the junctions are deposited at the same time and in the same process as the layer that determines the throat height, the junctions can be accurately placed relative to the transducer elements and thus provide a precise accurate indication of the throat height length during the lapping process. Preferably, therefore, the insulating layers 52–56 are formed together with the first insulating layer that separates the first pole piece from the conductors of the transducer elements and the conductors 36, 38 and 40 are electroplated at the same time that the second pole piece of the transducing elements are deposited.

In the embodiment of the invention shown in FIG. 6, the basic arrangement and the method for making the structure is substantially the same as that described above in connection with FIG. 2. However, it has been found that, by making the length of one of the straps substantially longer than the other strap, a greater precision can be achieved in the final throat height. The lapping operation always produces high levels of electrical noise, and the longer strap improves the precision of the electrical measurements due to a higher signal to noise ratio.

The embodiment shown in FIG. 6 comprises a right strap 34', the length of which is about twice the length of the left strap 32. For this reason, the resistance of the right strap 34' is higher, and the ratio of the resistance of strap 34' to the shunt resistor 64 is higher so that the influence of shunt resistor 64 is reduced. The right strap 34' is chosen as the longer strap since the junction switch 46, which is substantially coincident with the throat height line TH (see FIG. 3), is the most critical, and this junction switch 46 is connected to right strap 34'. Since the embodiment of the invention shown in FIG. 6 provides improved precision of the electrical measurements, this embodiment is the preferred embodiment.

Further details of the interconnection between the conductors and the strap can be obtained by referring to FIGS. 3 and 4. FIGS. 3 and 4 show the details of the right strap of FIG. 2. Common reference numerals are used throughout this description. Reference is made to the aforementioned U.S. Pat. No. 4,190,872 for a further description of the transducer elements described with the present invention.

As shown in FIGS. 3 and 4, the conductive material of the strap 34, preferably chromium, is deposited onto the wafer substrate material shown as substrate row 10. The insulation layers 54 and 56 are then placed over at least portions of the strap 34. The insulation layers 54 and 56 include the vias 46 and 48 which leave areas of the strap 34 exposed. The vias 46 and 48 are very precisely located relative to the optimum throat height measurement of the transducer elements. The conductors 38 and 40 are then preferably electroplated. The conductors 38 and 40 are electrically connected to the thin film resistors 62 and 64, respectively, and to the strap 34 through the vias 46 and 48. The vias 46 and 48 as previously stated, form the junction switching elements of the electrical lapping guides of the present invention. A line TH is shown approximately level to the top of the junction switch 46. The line TH can represent the final throat height desired as measured through the mask set that determined the junction switch 46 together with the insulation layer that formed the layer that eventually determines the throat height of the transducing element. Thus when the junction switch 46 is opened in the lapping process, the controller 30 can signal the lapping process to be halted because the final throat height is reached. The junction switch 46 is essentially opened because there is no electrical connection from the conductor 40 to the strap 34. The only interconnection is through the thin film resistor 62. Opening the junction switch 46 while lapping away the connecting material causes a jump in resistance level because the essentially lower resistive material of the conductor 40 and the strap 34 is removed as a bridge shorting out the thin film resistor 62. An electrically represented circuit of one of the electrical lapping guide systems 14 and 16 of the present invention is shown in FIG. 5.

Referring to FIG. 5, the reference numerals of the various resistors and the switches are given the same numeral at that of the element itself. The representative electrical configuration shown in FIG. 5 is a direct electrical replacement for the electrical lapping guide 16 shown in FIG. 2. The resistance of the various conductors is represented by reference numerals R36–R40. The thin film resistors are likewise represented by reference numerals R58–R64. The straps 32 and 34 shown are variable resistors R32 and R34 to represent that they change in resistance during the lapping process. The junction switches 42–48 in turn are represented by reference numerals S42–S48 to show the direct electrical replacement between the switches of FIG. 5 to the junction switches of FIG. 2. The switches S42–S48 are shown bridging the thin film resistors R58–R64, respectively.

The operation of the electrical lapping guide system of this invention will now be described. After the transducer elements are deposited together with the elements of the electrical lapping guides onto a wafer, the wafer is cut such that the substrate row 10 is formed with an electrical lapping guide systems 14 and 16 at each end of the row of transducer elements 12 as shown in FIG. 1. The substrate row 10 is fastened to the holder 18 and then placed in a lapping system such that the substrate row 10 is placed adjacent to the lapping plate 24 to lap away a portion of the material on one surface of the substrate row 10. The lapping is controlled by the electrical lapping guide systems 14 and 16 such that the correct throat height of the transducer elements 12 can be achieved. Relative motion between the lap plate 24 and the substrate row 10 is provided to start the lapping away of the material. The transducer throat height lengths, the lengths of the pole pieces, are shortened and the widths of the straps are narrowed during the lapping process. The resistances of the electrical lapping guide systems are directed to the multiplexer 26 for combination, to the meter 28 for measurement and onto the controller 30. The controller 30 in turn activates the actuators 20 and 22 to place the substrate rows 10 against the lapping plate 24 to start the lapping process. The controller 30 senses the electrical resistance of each of the four series parallel electrical circuits from both electrical lapping guide systems 14 and 16. One electrical lapping guide system is shown in FIG. 5 and therefore the controller for the electrical lapping guide system 16 senses the electrical resistance as measured by the conductor resistance R36, through the junction switch S42 through the strap resistance R32, through the second junction switch S44 and through the center tapped conductor resistance R40. The controller 30 is also measuring the resistance from the other half of this electrical lapping guide system 16 by sensing the resistance again throughout the center tapped conductor resistor R40 through the junction switch S46, the strap resistance R34, the second junction switch S48 and the right conductor resistance R38. Likewise, the controller 30 is sensing the resistances of the other electrically lapping guide system 14 located at the opposite end of the substrate row 10.

The lapping continues with the controller 30 keeping the resistances of each of the electrical lapping guide systems 14 and 16 as equal as possible by adjusting the associated actuator 20 and 22 according to the resistance sensed. The lapping continues in this fashion until it reaches the point identified by a line 66 in FIG. 2. At this point, the junction switch 42 should be opened at approximately the same time on both ends of the substrate row 10 since the junction switch 42 represented by switch S42 has been opened. As shown in FIG. 5, opening the junction switch S42 places the thin film resistor resistance R58 into the series circuit on the left side of the figure thereby increasing the resistance of this half of the circuit. This change in resistance is transmitted to the multiplexer 26 sensed by the meter 28 and the controller 30. This change can be used by the controller 30 to signify any one of a plurality of operations. For instance, a rough lap could take place until the opening of the junction switch 42 and a change to a medium or a fine lapping process could be then undertaken. Or perhaps the pressure applied by the actuators 20 and 22 can be lessened for a slower, more controlled lap. Or the change in resistance might merely be sensed by the controller 30 as an indication of further things to come. Each half of the electrical resistance circuit shown in FIG. 5 may also be used as a redundant lapping guide. That is, in the event one-half of the circuit is inoperative because of a deposition fault in the formation of the electrical lapping guide, the other half can be substituted with the controller 30 adapting accordingly.

If desired and in fact in the preferred process, the lapping continues until the switching junctions S42–S48 are all interrupted. The opening of the final switching junction 46, as is shown in FIG. 4, means that the lapping has reached the line TH. This could have been determined previously to be the optimum throat height length of the transducer elements. At this time the controller 30 removes all pressure by the actuators 20 and 22 to remove the substrate row 10 from contact with the lap plate 24. The holder 18 and the substrate row 10 are removed from the lapping system. The substrate row 10 is subsequently removed from the holder 18 and the substrate row is placed on machinery that forms the rails of the slider for eventual flying operation relative to a rotating disk. The electrical lapping guide systems 14 and 16 are cut off and discarded from the substrate row and the transducer elements 12 are separated into individual magnetic heads. The individual magnetic heads are then bonded to suspension elements for eventual insertion into a disk file system.

The advantages of the electrical lapping guide system according to the present invention are many. The electrical lapping guide can be constructed at the same time that routine fabrication processes for the thin film magnetic head are performed. The standard construction processes such as the photolithographic process, sputtering deposition and electroplating can be used. The electrical lapping guide systems can be formed with the same masks used in the construction of the thin film head thereby insuring accurate relationship between the transducer elements and the electrical lapping guides. Using the preferred elements in the electrical lapping guide of the present invention, the electrical lapping guide can be constructed after the deposition of the magnetic gap layer. This can be performed by depositing a very thin chromium layer of approximately 1000 angstroms, etching the chromium layer to obtain a pattern such as shown for the straps 32 and 34 and the thin film resistors 58–64 of FIG. 2. Then the insulating layers 50–56 as shown in FIG. 2 together with the photoresist insulation layer that is deposited on the first pole piece to electrically insulate the first pole piece to the conductor layers of the magnetic transducers can be spun onto the wafer, patterned by the photolithographic process and hard baked for permanency. The insulating layers 50–56 of the electrical lapping guides form the junction switches 42–48 for accurate position detection. The conductors 36–40 of the electrical lapping guides of FIG. 2 are deposited by electroplating at the same time that the second pole layer of the transducer is deposited. The second pole piece is generally made of nickel-iron and serves as the low resistors R36–R38 of the conductors 36–40. The conductors 36–40 interconnect the high resistance strap resistors R32 and 34 and the thin film resistors R58–R64 and the wires connecting the electrical lapping guide to the multiplexer 26. Again, reference is made to U.S. Pat. No. 4,190,872 for the identification of the different layers used in building a thin film transducer. Likewise, that patent teaches the importance of a particular throat height and the method of measurement of that throat height length.

In practice and referring to FIG. 2, it has been demonstrated that the switching planes for junction switches 42–48 are appropriately located at throat height positions of 20 microns, 2½ microns, 2 microns and 10 microns, respectively. The straps 32 and 34 are appropriately thin film resistance elements R32 and R34, preferably of a chromium material having a nominal conductivity or sheet resistance RS. Typically, a rectangular bar of chromium having a dimension of 500×80 micrometers (microns) will suffice for each of the straps 32 and 34. Each of the thin film resistors 58–64 also preferably of a chromium material, have line dimensions of 800×10 microns. The thin film resistors are, of course, deposited on the substrate at the same time and therefore have the same thickness as the straps 32 and 34.

During lapping of the substrate row 10, the resistance R32 and R34 of each strap 32 and 34 will follow the equation $$RX = RS \times \frac{L}{X + H} + RC \tag{1}$$

where RX is the actual resistance reading at an unknown lapping plane position X; RS is the sheet resistance of the straps; RC is the contact and lead resistance of appropriately connected conductors 36–40; L is the length of the strap subject to lapping; H is the strap/junction dimension. The strap/junction dimension is the distance from the edge of the strap parallel to the edge being lapped, and a particular junction switching plane; X is the distance from the lapping surface and a respective junction switch. This distance (X+H) represents the width of the strap. Once the final throat height has been achieved, X will be perfectly aligned with the zero throat height condition. In practice, the strap to junction dimension may preferably be 10 microns. By including a strap to junction dimension of this size, the effects of so-called rat bite on the rear edge of the strap, incurred during fabrication of the straps, tending to make the strap resistance non-linear, are avoided. During lapping, the reduction of the strap width X+H will result in an increase in resistance measurement RX. The process carried out by the system of FIG. 1 will now be explained with respect to the measurements of the equivalent electrical circuit of FIG. 5.

During a first lapping stage which is preferably a rough lap, wherein the dimension X is reduced from 70 microns to 20 microns, the measured resistance R32 and R34 of each of the straps 32 and 34 and the sum of the measured resistances R32 plus R34, can be shown to be the following:

$$R32,70 = \frac{RS \cdot L}{X + H} + RC1 + RC2 \tag{2}$$

$$R34,70 = \frac{RS \cdot L}{X + H} + RC3 + RC2 \tag{3}$$

$$R32 + R34,70 = \frac{2 \cdot RS \cdot L}{X + H} + RC3 + RC1 \tag{4}$$

$$R32,X = \frac{RS \cdot L}{X + 10} \tag{5}$$

The nominal width (W) and length (L) of the straps are known to be 80 microns and 500 microns, and H is 10 microns.

The first of these three equations contains four (4) unknowns. By assigning a nominal value to RC3, the second, third and fourth equations may be solved and a rough value of the resistivity RS and contact resistances RC1 and RC2 are obtained. The position of the lapping plane can then be determined as X by solving the equation 5 from these assumed and determined values.

When the first of the junction switches 42 changes state, at the distance X=20 microns, i.e., at line 66, the resistance change is detected at the conductors 36 and 40 and will show a step-wise change indicating that the thin film resistor 58 is now in the series measurement of the resistance of the strap 32. At this known position of the lapping plane, by adopting the previously determined values of RC1, RC2 and RC3 from the rough lapping stage, values of H, RS and W can be obtained from the following equations:

$$R32,20 = RS \cdot \frac{500}{20 + H} + \frac{800}{W^{**}} + RC1 + RC2 \tag{6}$$

$$R34,20 = RS \cdot \frac{500}{20 + H} + \frac{800}{W^{**}} + RC2 + RC3 \tag{7}$$

$$R32 + R34,20 = RS \frac{1000}{20 + H} + \frac{1600}{W^{**}} + RC1 + RC3 \tag{8}$$

where W** is the width of the straps.

As the lapping continues, the position of the lapping plane may be now determined from the following equation, using these additionally determined levels of H, RS and W, which represent calibrated parameters obtained by noting the change in state of the junction switch 42.

$$R32X = RS \cdot \frac{500}{20 + H} + \frac{800}{W^{**}} + RC1 + RC2 \qquad (9)$$

The opening of the junction switch 48 provides a step-wise change in the resistance measurement of strap 34. The opening of the junction switch 48 thus places the thin film resistor 64 in the series resistance measurement of strap 34.

Utilizing the previously determined values of H, RS, W, RC1 and RC2, three additional equations as below can be determined.

$$R32,10 = RS \cdot \frac{500}{10 + H} + \frac{800}{W^{**}} + RC1 + RC2 \qquad (10)$$

$$R34,10 = RS \cdot \frac{500}{10 + H} + \frac{800}{W^{**}} + RC2 + RC3 \qquad (11)$$

$$R32 + 34,10 = RS \cdot \frac{1000}{10 + H} + \frac{1600}{W^{**}} + RC3 + RC1 \qquad (12)$$

where $W^{**}$ is the width of the thin film resistors 56–64.

Now, during this fine lapping state of from $X=10$ microns to the nominal throat height, established to be approximately 2 microns in this embodiment, it is possible to solve the six equations (6), (7), (8), (10), (11) and (12) resulting at the $X=10$ micron switching point, and $X=20$ microns switching point, to determine all the values of the unknowns RC1, RC2, RC3, W, RS and H. Thus, the resistance R32 and R34 are fully calibrated during the fine lap stage, and fine lapping may be achieved by monitoring this resistance level defined by equation (1) at the controller 30 to determine when the nominal throat height of 2 microns is achieved.

The remaining junction switches 44 and 46, previously identified as located at 2 and 2½ microns, can be used to terminate lapping of the substrate row. The opening of the junction switches 44 and 46 will produce two additional step-wise changes in resistance measurements for straps 32 and 34. At this time, controller 30 controls actuators 20 and 22 to terminate lapping. The holder 18 is retracted moving the substrate row 10 from the lapping plate 24, to permit the fine surface polish to commence.

The foregoing embodiment has been described with respect to the operation of one of the electrical lapping guide systems 16. The remaining lapping guide system 14, shown in FIG. 1, is similarly constructed and the resistance measurements made to permit an accurate determination of the position of the lapping plane with respect to the desired throat height are the same. Thus, it is possible to compare in controller 30 the lapping plane position on each side of the substrate row 10, permitting leveling thereof. As is known by those skilled in the art, the substrate row 10 may undergo a bow effect from the stress applied by the lapping plate 24 and the actuators 20 and 22. This bow effect may move the plane of pole tips for the transducers 12 in the center closer or further from those at the outer edge of the substrate row. As such, the bow effect is taken into effect by establishing a nominal throat height of 2 microns in accordance with the preferred embodiment. Thus, although the pole tips of the outer transducers will lie 2 microns away from a desired plane as determined by the electrical lapping guides, the centrally located transducer element will have a pole tip plane greater than zero.

The principles of the present invention have now been made clear in an illustrative embodiment. There will be immediately obvious to those skilled in the art many modifications of structure, arrangement, proportions, the elements, materials and components used in the practice of the invention. For instance, the strap material of the present invention is preferably chromium but it should be evident that any electrically conductive material may be used. Also, only one-half of the electrical lapping guide system described herein could form the total electrical lapping guide system. As explained previously, each half could form a redundant system if necessary. One-half of the system from the center tab conductor to one of the side conductors is sufficient for controlling the lapping process to accomplish the advantages and objects of the present invention. Various deposition techniques well known in the process for construction of thin film heads can be used in the deposition of the electrical lapping guides. For instance, any type of vacuum deposition could be used for all of the layers of the electrical lapping guide and electroplating is not absolutely necessary for the construction of the electrical lapping guide according to the present invention. The appendant claims are, therefore, intended to cover and embrace any such modification, within the limits only of the true spirit and scope of the invention.

What is claimed is:

1. An electrical lapping guide for batch fabricating thin film transducers comprising:
   a first strap of electrically conductive material;
   an insulator made of an electrically insulative material deposited on at least a portion of said strap;
   a first pair of electrically conductive conductors, each conductor spaced apart from the other and in electrical contact to said first strap along the length of said strap;
   at least one via formed in said insulator and placed such that the via indicates a specific relationship to the transducer;
   at least one of said conductors making electrical contact with said first strap through the via; and
   a resistor of electrically conductive material connected between each of said conductors and said first strap that are interconnected by one of said vias.

2. The electrical lapping guide of claim 1 wherein the resistance of said resistor is much greater than the resistance of said first strap of electrically conductive material.

3. The electrical lapping guide of claim 1 additionally comprising:
   a second strap of electrically conductive material; and
   a second pair of electrically conductive conductors, each conductor spaced apart from the other in electrical contact to said second strap along the length of said strap.

4. The electrical lapping guide of claim 3 wherein said second strap of electrically conductive material has a length aboout twice the length of said first strap of electrically conductive material.

5. A method for making an electrical lapping guide on a supporting substrate for accurately obtaining a desired throat height, during the process of forming at least one batch fabricated magnetic head on the supporting substrate, comprising the steps of:

selecting a special site on the substrate adjacent to and aligned with the transducer;

depositing a first conductive film layer of an electrically conducting material covering at least the selected special site to form a strap;

depositing an insulation layer of an electrically insulating material onto the deposited first conductive layer at two spaced apart areas at the selected special site, said insulation layer also comprises the throat height determining layer of the magnetic head, said insulation layer includes vias exposing said first conductive film layer at least at opposing ends of an elongated shape of said insulation layer covering said first conductive film, with the elongated shape having at least a portion of one side that assists in the definition of the desired throat height together with the vias;

depositing a second layer of an electrically conductive material over the vias of exposed conductive film layer and in electrical contact with the second end of the thin film resistor, said second conductive film layer electrically contacting said first conductive film layer through the vias to form junction switches; and depositing a shunt resistance in parallel with said junction switch whereby a change in state of said junction switch can be detected as a step change in resistance.

6. A method for batch fabricating thin film magnetic transducers comprising:

depositing a plurality of thin film transducers on a substrate, each comprising first, second and third layers, said first and third layers comprising magnetic pole pieces having co-planar front edges, said pole pieces separating at a portion defined by a front edge of said second layer of insulating material;

depositing adjacent an end of said plurality of transducers a lapping guide resistor, said resistor having a front edge parallel to said insulating layer front edge;

depositing at least one switching junction on said substrate, said switching junction having an edge defining a switching plane between said insulating layer front edge and said lapping guide resistor front edge, and parallel thereto, said switching junction being serially connected to said lapping guide resistor;

depositing a shunt resistance in parallel with said switching junction whereby a change in the state of said switching junction can be detected as a step change in resistance;

lapping said substrate along a plane parallel to said front edges;

monitoring the resistance of said lapping guide resistor during said lapping whereby the position of the lapped edge with respect to said insulating layer may be monitored;

monitoring the switching state of said switching junction;

comparing the position of said lapped edge determined from said resistance measurement with the position of said switching plane when said switching junction changes state, whereby an error in said position as determined from said resistance measurement is determined; and compensating said monitored resistance levels for said error, whereby subsequent monitored resistance measurements produce an accurate position of said ground edge.

7. A method for controlling the throat height of batch fabricated thin film transducers deposited on a single substrate comprising:

locating on said substrate supporting said thin film transducers at least one electrical lapping guide resistor, said resistor having a front edge parallel to a desired final plane of pole tip ends of said thin film transducers;

locating on said substrate at least one switching junction, said switching junction having a switching plane parallel to and in between said plane of a desired pole tip ends and said resistor front edge;

depositing a shunt resistance parallel with said switching junction whereby a change in the state of said switching junction can be detected as a step change in resistance;

measuring the resistance of said electrical lapping resistor during lapping of said thin film transducer pole tips, whereby the position of a lapped plane and pole tip ends is continuously monitored;

monitoring the state of said switching junction;

comparing the position represented by said measured resistance with the position of said switching junction at the time said switching junction electrical state changes to determine a measurement error for said electrical lapping guide resistor;

adjusting subsequent electrical resistance measurements to compensate for said measurement error whereby the plane of said pole tip ends are accurately measured; and terminating said lapping when a desired position of said pole tip ends are measured.

8. The method of claim 7 further comprising:

locating a plurality of said switching junctions on said substrate, each having a different switching plane parallel to said front edge and final pole tip plane;

comparing the distance represented by said measured resistance with the position of each junction switching plane at the time a respective switching junction changes electrical state, to determine a measurement error of said electrical lapping guide; and modifying subsequent resistance measurements to eliminate the measurement error determined by a previous junction switching state change, whereby the plane of said pole tips is continuously determined by measuring said electrical lapping guide resistance, and said resistance measurements are modified after each switch junction changes state to reduce said measurement errors.

9. A method for controlling the throat height of batch fabricated thin film transducers deposited on a single substrate, said thin film transducers including pole piece tip ends extending a distance greater than a desired final throat height to an initial position, the method including lapping said transducer pole piece tip ends from said initial position to a desired pole piece tip end plane which defines a final tip length, said method comprising the steps of:

locating on said substrate a leveling resistor, said resistor having one edge parallel to said desired plane of said thin film transducer pole piece tip ends;

locating first and second switching junctions on each end of said leveling resistor, each of said switching junctions having a switching plane between said parallel edge and said desired plane; each of said switching junctions being serially connected with a respective end of said leveling resistor;

depositing a shunt resistor across each of said switching junctions whereby a change in the state of one of said switching junctions can be detected as a step change in resistance;

measuring the resistance of said resistors during lapping of said pole piece tip ends to said final tip length to determine the positions of said pole piece tip ends, said resistance representing said position as $$RX = \frac{RS \cdot L}{(X + H)} + RC$$

where H is the distance between a first of said junction planes and an edge opposite to said one edge of said leveling resistor, X is the distance from said parallel edge to said junction switching plane, RS is the sheet resistance of said leveling resistor, L is the length of said one edge, RC is the contact resistance of said leveling resistor, and RX is the resistance measurement at the distance X;

determining the contact resistance RC from said measured resistance when the first change of state of said switching junction occurs;

measuring the resistance of said leveling resistor when a subsequent change of state of said switching junctions occurs;

determining the distance X represented by said subsequently measured resistance and said previously determined contact resistance RC;

comparing said distance X represented by subsequently measured resistance with the position of the second of said switching junction producing a subsequent change of state whereby a measurement error for said leveling resistor is obtained; and correcting further measurements of said leveling resistor to compensate for said measurement error whereby said further measurements indicate an accurate throat height for said transducer pole piece tips.

10. In a method for batch fabricating thin film transducers, said thin film transducers including pole tips extending a distance greater than a desired final throat height to an initial position, said method including lapping said transducer pole tips from said initial position to a desired pole tip plane which defines a final throat height, the improvement comprising:

depositing on a substrate containing said thin film transducers first and second leveling resistors RA and RB, each having one edge parallel to said desired pole tip plane, and first and second connection ends, each of said one edges being lapped with said pole tips;

depositing on said first resistor first connection end a first switching junction, and on said second resistor second end a second switching junction, said switching junctions having switching planes parallel to said desired pole tip plane and positioned at known distances therefrom;

depositing first and second shunt resistors across said first and second switching junctions;

measuring through said switching junctions the resistance of said first and second leveling resistors RA, RB and the series combinations of said resistors RA+RB when the first of said switching junctions changes state from lapping said substrate; and determining from said measured resistance levels and position of said first switching junction to change state, the electrical parameters of said first and second leveling resistors and switching junctions whereby subsequent positions of said pole tip plane may be determined by continued measurement of said first and second resistance levels, and said electrical parameters.

11. The method of claim 10 further comprising: measuring the resistance of said first and second leveling resistors RA, RB and the series resistance (RA+RB) thereof when a second of said switching junction changes state.

12. The method of claim 11 further comprising: redetermining said measured resistance levels and electrical switching junction parameters from the position of said second of said switching junctions to change state and said resistance measurements at the time that said second switching junction changes state.

13. The method of claim 12 further comprising: determining the subsequent pole tip plane from said redetermined electrical characteristics whereby said pole tip plane may be accurately positioned from said redetermined electrical characteristics.

14. The method of claim 10 further comprising:

depositing at least one additional switching junction between the second of said switching junctions and the desired pole tip plane on a remaining edge of one of said resistors; and terminating lapping operations after said additional switching junctions change state.

15. The method of claim 14 wherein said parameters are related to said resistance measurements as:

$$RA + \frac{RS \cdot L}{X + H} + RC1 + RC2$$

$$RB = \frac{RS \cdot L}{X + H} + RC3 + RC2$$

where H+X is the width of the resistor; RS is the resistivity of the resistor material; RC1, RC2 and RC3 are the contact resistances of said resistors; L is the length of said resistors; and, the series resistance of said resistors is $$RA + RB = \frac{2 \cdot RS \cdot L}{X + H} + RC3 + RC2$$

and said electrical parameters are computed after the first change of state of said electrical junctions by assuming a width (H+X) which corresponds to the position of said electrical junction having a changed state, and assuming a nominal value of RC3, contact resistance associated with the second end of said second resistors and second switching junction.

16. The method of claim 15 wherein said contact resistances RC3, RC1, RC2 and resistivity RS are recomputed when the second of said junctions changes state.

17. A method for controlling the throat height of a plurality of batch produced thin film magnetic heads which are formed by depositing a plurality of thin film magnetic transducers on a substrate in three distinct process steps which include:

depositing a first magnetic pole piece;

depositing a first insulation $I_1$ layer over a portion of said magnetic pole piece; and depositing a second magnetic pole piece over said insulating $I_1$ layer and over a pole tip region of said first pole piece comprising:

depositing a chromium resistor on said substrate adjacent said thin film magnetic head, having one edge in parallel with the front edges of said pole piece tips during the deposition of said first magnetic pole piece;

depositing insulating portions on two edges of said resistor during the deposition of said $I_1$ insulation layer, each of said insulating portions having a via formed therein parallel to a front edge of said $I_1$ layer and said pole piece tips;

depositing a conducting layer over each of said insulating portions, a front portion of each conducting layer contacting said resistor through said via, and a back portion thereof being separated from said resistor by said insulating portions; each of said conducting portions and resistor comprising a switch junction having a switching plane located in parallel with said $I_1$ layer and at a known distance away from the $I_1$ layer;

depositing a shunt resistance on said substrate connected across each of said switch junctions;

monitoring the resistance of said chromium resistor through said switch junctions as said pole tip edges are lapped; and calibrating said resistance measurements when a switching junction changes state, as evidenced by a step change in said resistance measurements, whereby subsequent resistance measurements indicate a calibrated position of said pole tips with respect to said $I_1$ insulation layer.

* * * * *

UNITED STATES PATENT AND TRADEMARK OFFICE
CERTIFICATE OF CORRECTION

PATENT NO. : 4,675,986

DATED : June 30, 1987

INVENTOR(S) : E. T. Yen

It is certified that error appears in the above—identified patent and that said Letters Patent is hereby corrected as shown below:

Column 13, line 27, after the word "resistors" change the number "56" to --58--.

Column 18, line 44, after the letters "RA" delete "+" and insert instead -- = --.

Signed and Sealed this

Fifteenth Day of December, 1987

Attest:

DONALD J. QUIGG

*Attesting Officer*  *Commissioner of Patents and Trademarks*